(12) United States Patent
Woolston

(10) Patent No.: US 7,247,097 B2
(45) Date of Patent: *Jul. 24, 2007

(54) ELECTRONIC SWORD GAME WITH INPUT AND FEEDBACK

(76) Inventor: Thomas G. Woolston, 8408 Washington Ave., Alexandria, VA (US) 22309

( * ) Notice: Subject to any disclaimer, the term of this patent is extended or adjusted under 35 U.S.C. 154(b) by 0 days.

This patent is subject to a terminal disclaimer.

(21) Appl. No.: 10/971,349

(22) Filed: Oct. 22, 2004

(65) Prior Publication Data

US 2005/0085298 A1    Apr. 21, 2005

Related U.S. Application Data

(60) Division of application No. 09/665,669, filed on Sep. 20, 2000, now Pat. No. 6,902,482, which is a continuation of application No. 08/977,806, filed on Nov. 25, 1997, now Pat. No. 6,162,123.

(51) Int. Cl.
A63F 9/22    (2006.01)
G09G 5/00    (2006.01)

(52) U.S. Cl. ............... 463/37; 273/148 B; 345/156

(58) Field of Classification Search ........... 463/1–3, 463/7–8, 36–42; 273/148 B; 345/156, 158
See application file for complete search history.

(56) References Cited

U.S. PATENT DOCUMENTS

| | | | |
|---|---|---|---|
| 3,877,316 A | 4/1975 | Reiter et al. |
| 3,877,662 A | 4/1975 | Reiter et al. |
| 4,099,714 A | 7/1978 | Willis |
| 4,573,651 A | 3/1986 | Stanton |
| 4,630,817 A | 12/1986 | Buckley |
| 4,695,953 A | 9/1987 | Blair et al. |
| 4,923,142 A | 5/1990 | Creusot et al. |
| 4,925,189 A | 5/1990 | Braeunig |
| 4,959,725 A | 9/1990 | Mandle |
| 5,090,260 A | 2/1992 | Delroy |
| 5,131,165 A | 7/1992 | Benson |
| 5,138,154 A | 8/1992 | Hotelling |
| 5,145,446 A | 9/1992 | Kuo |
| 5,232,223 A | 8/1993 | Dornbusch |
| 5,354,057 A | 10/1994 | Pruitt et al. |
| 5,437,420 A | 8/1995 | Rosen |
| 5,453,758 A | 9/1995 | Sato |
| 5,516,105 A | 5/1996 | Eisenbrey et al. |
| 5,542,672 A | 8/1996 | Meredith |

(Continued)

FOREIGN PATENT DOCUMENTS

JP        6301474        10/1994

(Continued)

*Primary Examiner*—Mark Sager
(74) *Attorney, Agent, or Firm*—Berkeley Law and Technology Group, LLP

(57) ABSTRACT

An electro-mechanical device for providing an input to a computer program and said computer program providing a tactile output through said electro-mechanical device to a user. More specifically, the present invention provides an electro-mechanical virtual sword game apparatus that receives positional information from sensors on the sword apparatus and the sword apparatus contains a propulsion gyrostat that under the control of a computer process may be topple to provide a torque on the housing of the sword apparatus that may be used to simulate the impact of sword blows.

26 Claims, 11 Drawing Sheets

U.S. PATENT DOCUMENTS

| | | |
|---|---|---|
| 5,667,171 A | 9/1997 | Fowell et al. |
| 5,685,776 A | 11/1997 | Stambolic et al. |
| 5,692,956 A | 12/1997 | Rifkin |
| 5,713,792 A | 2/1998 | Ohzono et al. |
| 5,741,182 A | 4/1998 | Lipps et al. |
| 5,751,273 A | 5/1998 | Cohen |
| 5,823,845 A | 10/1998 | O'Berrigan |
| 6,028,593 A | 2/2000 | Rosenberg |
| 6,042,478 A | 3/2000 | Ng |
| 6,162,123 A | 12/2000 | Woolston |

FOREIGN PATENT DOCUMENTS

| | | |
|---|---|---|
| JP | 8010446 | 1/1996 |

SENSOR AND TORQUE CONTROL

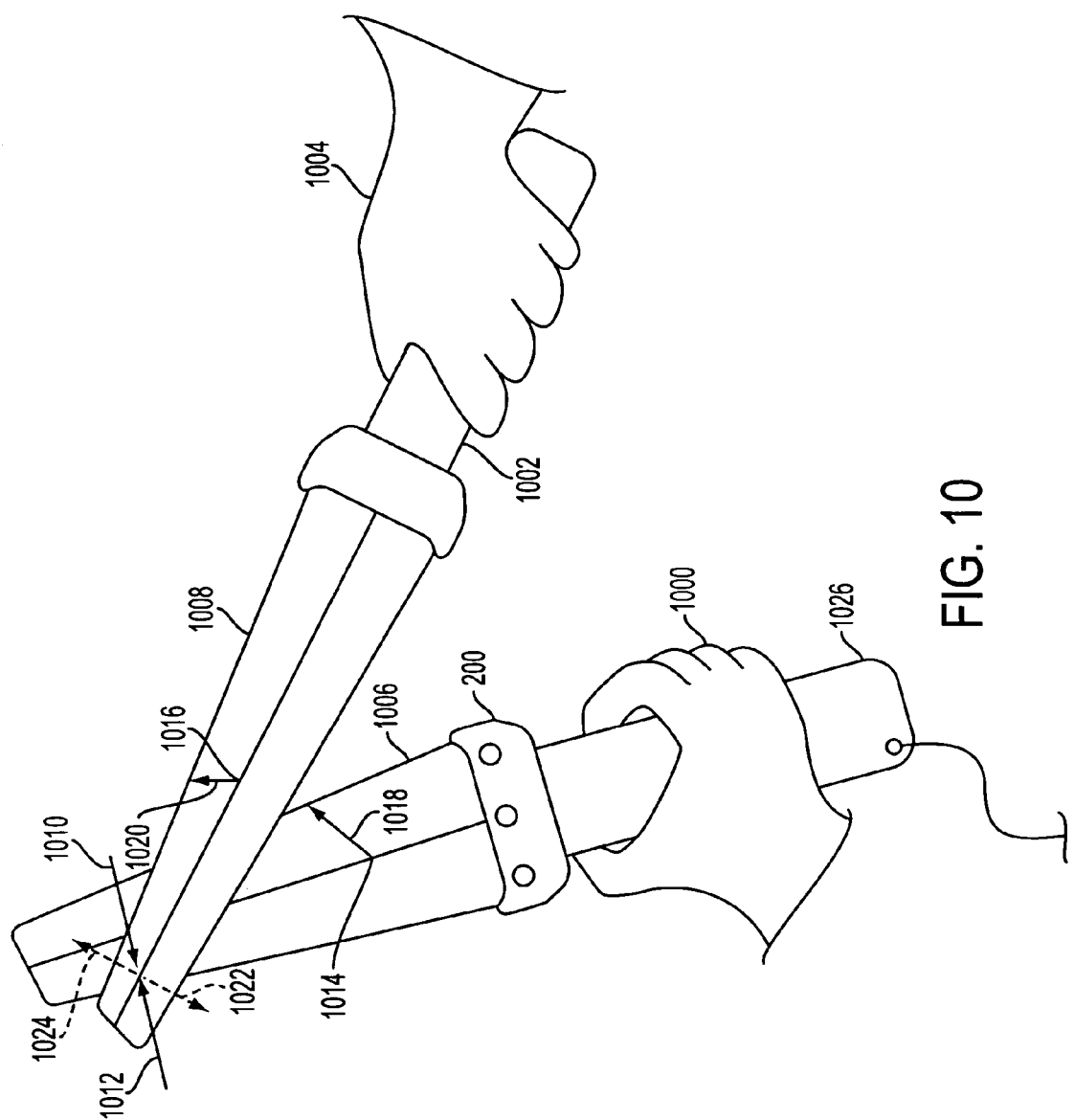

ELECTRONIC SWORD GAME WITH INPUT AND FEEDBACK

This patent application is a divisional and claims the benefit of priority under 35 USC 120 from U.S. patent application Ser. No. 09/665,669, filed Sep. 20, 2000, now U.S. Pat. No. 6,902,482, which is a continuation of U.S. application Ser. No. 08/977,806, filed Nov. 25, 1997, now U.S. Pat. No. 6,162,123.

The present invention relates to interactive electronic games. More specifically, the present invention provides an apparatus in which a participant may input velocity and position information into an electronic game and receive physical feedback through the apparatus from the electronic game.

BACKGROUND OF THE INVENTION

The electronic game industry has seen a dramatic evolution from the first electronic ping-pong game ("pong") to the state of modern games and consumer home electronics. In general, hardware advances that have increased processing power and reduced cost has fueled this evolution. The increased availability of low cost processing power, as well as consumer expectation for improved game content, demands that new games be developed to take advantage of this processing power. This can be seen especially in the new 64 bit processing devices such as the Nintendo 64™ and the processing power available in home personal computer games and/or in arcade game platforms. These new hardware platforms are so powerful that a whole new genre of games has to be developed in order to fully utilize the hardware.

Electronic game input, traditionally, has been limited to joy sticks, button paddles, multi-button inputs, trackballs and even a gyro mouse that has a gyroscope means for determining the orientation of the mouse. Recently Nintendo has deployed a "rumble" device to provide vibratory feedback to game console users. Traditional computer input means are well know to those in the arts and require no further discussion. The gyro-mouse, in the context of the present invention, however, deserves some further discussion.

The gyro-mouse, provided in U.S. Pat. No. 5,138,154, to Hotelling, the relevant portions herein incorporated by reference in their entirety, provides a means for using the gyroscopic effect in a computer input device to recover user input. The gyro-mouse provides a gyroscope contained within a ball so that ball may be rotated. This rotation translates into two dimensional or three dimensional motion for software receiving the gyro-mouse input to display on a computer screen. Thus, the gyro-mouse is somewhat an extension of the track ball paradigm for a computer input device.

The gyroscopic effect has also been harnessed for practical commercial applications. One of the more interesting gyroscopic effects is brought about through the principal of conservation of angular momentum. As witnessed in gyroscopic phenomena, a gyroscope creates a force at right angles to a force that attempts to "topple" the gyroscope. Thus, a gyroscope when left alone or mounted in a double gimbal arrangement allowing the gyroscope to move freely in both axes, will resist movement and/or attempt to hold its own angular position. Gyroscopes are also known to have precession due to the earth's effect on the gyroscope. Gyroscope procession is not especially pertinent to the present invention, however, its principals and mathematical proofs and formula are herein incorporated by reference.

The navigational arts also provide a means for harnessing gyroscopic phenomena to determine the inertial position of a vehicle such as an aircraft. In an inertial navigation system, the gyroscope is mounted in a double gimballed arrangement and allowed to rotate without resistance in all directions. As the aircraft turns, rotates, and/or changes direction the gyroscopic effect keeps the inertial navigation gyroscope at the same angle. High precision means are used to determine how much the gyrostat has rotated, in actuality the aircraft rotating around the gyroscope, and this measurement in combination with high precision accelerometers provides a means for tracking the change in an aircraft direction. This instrumentality in conjunction with precision timing and velocity measurements provides a means for continuously determining an aircraft navigational position.

In another application of the gyroscopic effect, a large gyroscope can be used to create an effect that in some aspects is the reverse that of an inertial navigation system. Here, a large gyrostat mass (the flywheel) can be use to stabilize or position certain objects such as spacecraft. In the spacecraft application, such as in U.S. Pat. No. 5,437,420, the relevant portions herein incorporated by reference in their entirety, large flywheels and high torque motors and brakes are used to topple the flywheel. The spacecraft then feels a moment of thrust at right angles to the torque that is applied to the gyrostat. This way, and in others such as the "pure" inertia of rotation of causing a flywheel mass to accelerate or decelerate rotation, spacecraft attitude may be changed through gyrostatic means. In other stabilization applications, gyrostats are used to stabilize platforms such as cameras and other precision instruments, in general by attaching a gyrostat to the instrument platform.

Gyrostats have been used in conjunction with wheels to provide linear propulsion. Through a systems of gears and linkages, U.S. Pat. No. 5,090,260, incorporated herein by reference in its entirety, provides a means for translating the gyrostatic toppling effect into a linear force for propulsion.

SUMMARY OF THE PRESENT INVENTION

The present invention is an electronic game with interactive input and output through a new, novel and non-obvious player interface apparatus. The new player interface apparatus may be a hand held apparatus that may use sensors to determine the position of the apparatus and the gyrostatic effect to provide tactile feedback to the user. More particularly, in one embodiment of the present invention, the apparatus may be used in conjunction with software to create an electronic interactive sword game. In the sword type embodiment of the present invention, the hand held apparatus is preferably about the size of a three and/or four D-size cell battery flashlight and is adapted to be held by either one and/or two hands. The sword type device may be ornamentally decorated to resemble the hilt and/or handle part of a traditional and/or futuristic sword. Contained within the sword housing is a gyrostatic propulsion device from which the gyrostatic toppling effect is utilized to create a torque and/or the feel of sword blows on the sword handle and, thus, on the player holding the sword apparatus.

In overview, one or more gyrostat(s) inside the sword apparatus may be used as the "propulsion" gyrostat, hereinafter, the "propulsion gyrostat." The propulsion gyrostat may be configured with a relatively "large" mass flywheel and a high speed electric motor to spin the flywheel and, thus, provide a source of gyrostatic power. The flywheel of the propulsion gyrostat may be configured in a double gimbal housing wherein each axis of freedom, for example, the pitch and yaw of the flywheel, may be controlled by high torque electric motors. By applying the appropriate voltage to the high torque motors, the propulsion gyrostat may be "toppled" in such a way as to create a calibrated torque on the whole sword apparatus, e.g., the sword housing. This calibrated torque may be used to simulate, inter alia, a sword blow as felt at a sword's handle. Through the interaction of successive sword blows, e.g., torque provided by the propulsion gyrostat to provide the "feel" of sword blows, and interactions with virtual swordsman opponents, the present invention provides a novel and exciting interactive sword game that physically involves the player interactivity with the game.

In the preferred embodiment, the present invention works in conjunction with an electronic game and/or under the control of the electronic game. Thus, game "play" and/or plot features can be used to enhance the effectiveness of the present invention in creating the illusion of sword fighting. For example, game "play" and/or plot elements may be used to encourage the player to conserve the rotational energy stored in the propulsion gyrostat. This conservation of energy may be rewarded in the game interaction by producing more "powerful" sword strikes when the propulsion gyrostat of the sword apparatus is at full power storage, e.g., optimal rotational speed and/or a large flywheel in the sword apparatus. Keeping the propulsion gyrostat at full and/or near full power storage allows the sword apparatus to create the maximum impulse torque available thereby creating the most effective and powerful sword illusion.

It is understood that the sword apparatus of the present invention may not need a blade but the blade may be represented in the virtual space in the game itself. This may be done either on the computer screen or through the use of virtual reality glasses and/or other display apparatus. Thus, in the virtual reality domain, the computer may generate a sword blade that appears to extend from the hand held sword apparatus of the present invention. However, a plastic blade and/or other ornamental blade extending from the apparatus is within the scope of the present invention.

In another embodiment of the present invention, other virtual representations of the virtual instrument that is representative of the object held by the player are within the scope of the present invention such as a gun, bazooka, knife, hammer, axe and the like and the gyrostat propulsion instrumentality of the present invention may be controlled accordingly to provide the appropriate feedback to simulate the virtual instrument. For example, in the gun and/or pistol embodiment of the present invention the gyrostat feedback means may be used to simulate events such as the "kick" from a gun, or the "crush" of a hammer blow.

Another feature of the present invention is to have a macro gyroscopically powered inertia navigational means on-board the band held device. Such a small apparatus is available from Sony Corporation. The gyroscopic inertial positioning system may keep the computer game apprised of the spatial attitude and/or location of the sword apparatus in such a way that the game may provide the proper moments of torque on the motors to provide feedback to the player.

Yet another feature of the present invention is to use sensors, e.g., a receiver and/or a transmitter, on the sword apparatus and an array of sensors, e.g., receivers and/or transmitters, external and/or internal to the sword apparatus to determine the spatial attitude and/or location of the sword apparatus. In the preferred embodiment of the present invention, the sword apparatus uses infrared blasters, e.g., high output infrared transmitters such as those found on modern universal remote television controls, to output a pulse and/or timed emission of infrared light which may then be received at the remote sensors, which in the preferred embodiment are infrared receivers, whereupon the timing and/or phase differential of the received signals may be used to triangulate and determine the spatial position of the sword apparatus. An infrared output at both the top and the bottom of the sword apparatus may be used to determine the attitude of the sword apparatus and is within the scope of the present invention.

Game play and/or game plot may be used to encourage the player to maintain the sword apparatus within a predetermined field of play. For example, if the gaming program determines that the sword apparatus is positioned near the edge of a predetermined game field, the game software of the present invention may produce a virtual attack and/or event on the player from the center and/or opposite side of the game field to encourage the player to move the sword apparatus toward the "center" of the predetermined game field. It is understood the that the game of the present invention may also use a "mysterious" force feature, discussed further below, to encourage the player to move the sword apparatus toward the center of the predetermined game field.

Economical high torque motors are found in many common children's toys such as radio controlled cars and other devices. It is understood, that the present invention may have a gyrostat of sufficiently high mass and may be "spun" at a sufficiently high speed in order to convey to the player, through the gyrostatic toppling effect, the desired tactile game effect and/or torque on the player. The torque on the propulsion gyrostat may be a calibrated and/or variable force and, therefore, the effect may be a calibrated and/or variable force imparted to the player. It is understood that the fictitious "light saber" sword as popularized in the Star Wars™ fictionalized universe may be an appropriate metaphor for the game of the present invention. In the light saber metaphor, because a light saber is a fictional device, the game effects and/or game plot may be optimized to work in conjunction with the sword apparatus of the present invention. For example, the blow of crossing swords may use a calibrated and/or variable tactile feedback to the player where low energy storage in the propulsion gyrostat may be coordinated with game interaction such as allowing an opponent's sword to partially and/or completely pass through the players "light saber" defense. In another example, the light saber metaphor may allow the light saber virtual blade to strike through objects and, thus, may require a relatively small tactile feedback amount, thus, creating the illusion of a powerful virtual sword that can strike through objects. In contrast to a virtual medieval sword, wherein the steel blade cannot strike through all objects and, therefore, the striking of an object, such as a virtual tree, may require a massive tactile feedback response in order to "stop" the sword blow cold. Thus, the illusion of the medieval sword may be lost because of overloading, e.g., over draining of the rotational gyrostatic energy, the propulsion gyrostatic tactile feedback means of the present invention. That is not to say, of course, that a medieval sword embodiment is not within the scope of the present invention, for indeed it is as well as swords and blades of all types and sizes.

The light saber metaphor may be most appropriate, here, because the light saber metaphor may allow a player to strike through walls, e.g., the light saber may cut through the virtual walls. However, the player may still feel feedback as the sword passes through a virtual reality object, e.g. walls.

Allowing the object to pass through the virtual reality object without stopping it "cold", thus, allows the system to conserve its rotational energy for other interactions with the game.

Another interesting aspect of the present invention is the ability of the software to lead a player's movements, as well as provide impact feedback. A good example of this would be, again, the Star Wars™ metaphor where the player is told to "feel the force." The game of the present invention may apply a "mysterious force", discussed further below, which is essentially a small torque from the propulsion gyrostat whereby the sword device may "lead" the player's sword blows and/or movement.

Another aspect of the present invention is the ability to network multiple game play stations to allow virtual sword fights between multiple players and/or the coordinated efforts of multiple participants. In a two player mode, conventional modem means may be used to connect game stations in a back-to-back configuration. Telemetry between the game stations may be used to convey positional, attitudinal and inertial mass, explained further below, of the respective sword devices between game stations. In another configuration, multiple players may network together with a server computer acting as the communication hub between multiple game stations. A low cost network such as the internet may be used as the network transport protocol. Alternatively, one game station may be configured as a master station, acting as a communication master and other game stations may be networked to the master station.

BRIEF DESCRIPTION OF THE FIGURES

FIG. 10 shows a depiction of the sword apparatus in sword contact with a virtual opponent.

DETAILED DESCRIPTION OF THE INVENTION

Figure 1:
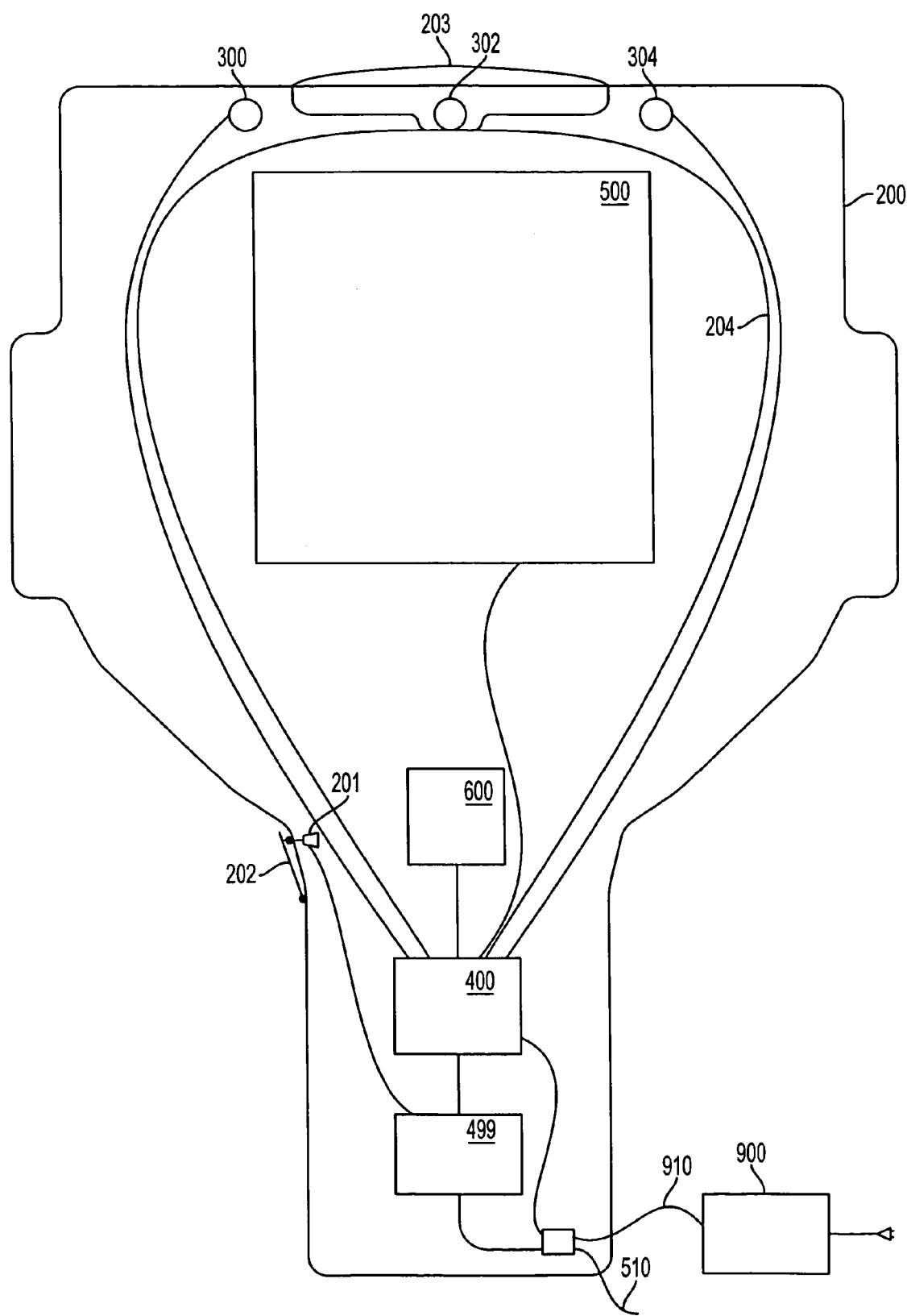
FIG. 1 shows a cross sectional profile of one configuration of the sword game of the present invention. Sword housing 200, power supply 900, power supply cord 910, data link to game controller 510, control logic 499, voltage control circuits for the motors and sensor inputs 400, gyrostat position detector circuit and positional gyroscope 600, safety switch 201, safety switch lever 202, propulsion gyroscope device 500, Speaker 203, infrared receivers and/or blasters 300, 302 and 304. It is understood that the infrared detectors and blasters are interchangeable into different operable configurations.

Turning now to FIG. 1, the sword game of the present invention has a sword housing 200 not to scale which is preferably made of a plastic material that is light weight yet strong enough to handle the forces imparted by the propulsion gyrostat. The torque forces from the present invention may be able to approximate the feel of a real sword battle, therefore, the material for the housing, 200, should be of sufficient strength to safely handle the torque imparted by the torque propulsion system 500. It is understood that the sword housing 200 may be made of metal, cast aluminum, plastic or other materials known to those in the art, for handling this amount of torque. It should be noted that the housing 200 may also serve as a safety enclosure if the propulsion gyrostat contained in block 500 were to have catastrophic failure and become free of its bearings. This may be accomplished by lining the inside and/or outside of housing 200 with kevlar or other highly impact resistant material to contain the flywheel of the propulsion gyrostat within the housing. However, in the preferred embodiment housing 200 may be sufficiently strong so as to contain the propulsion gyrostat in the event of catastrophic failure while maintaining a means for low cost plastic injection molding manufacturing techniques. Housing 200 may also be configured with shock absorbing material on the exterior of the housing to cushion impact should the housing contact physical objects. Block 900 represents an external power supply. The power supply 900 may be used to rectify household voltage into usable voltages for the sword game of the present invention. The sword apparatus of the present invention may have sufficient current draw to require a separate power supply and this current draw may not be available from the voltage outputs from a standard personal computer and/or game controller device. The high current draw of the present invention may be due to the high torque motors of propulsion gyrostat 500 necessary for the torque propulsion. However, it is understood to those skilled in the arts, that power supply line 910 may be coupled into the data line 510 to integrate power lines 910 and 510 into a single cord for data controls and power to the sword apparatus. Moreover, it is within the scope of the present invention to draw power from batteries, the game controller 240 and/or from a computer peripheral interface port if sufficient power is available. The sword housing 200 may be adapted to receive a speaker 203 to provide an audio output for game sounds. Speaker 203 may be connected by line 204 to control circuits 400. Control circuits 400 may contain a digital to analog converter to generate game sounds.

Block 499 may represent the circuit board for the control circuits of the present invention. Control circuits 499 may have a suitable communication means such as a USART and/or ethernet and/or universal serial bus interface to receive data signals from the game controller 240. It is within the scope of the present invention to use external circuits and use analog controls signals and/or wireless analog and/or digital control signal to provide an interface between the sword apparatus and the game controller 240. In the preferred embodiment of the present invention, circuits 499 may contain a suitable protocol communications device or procedure to establish communications between the sword device and game controller 240. Circuits 499 may also contain the processing elements necessary for control and/or execution of software and/or software elements to effect control of the sword apparatus of the present invention. The control functions and/or part or parts of the control function may be moved into the game controller 240.

Block 400 may represent the control circuits necessary for the analog drive voltages for the propulsion gyrostat means 500. It is understood that because of the high torque available from is the propulsion gyrostat 500 separate control circuits such as high powered transistors and/or FETs may require separate circuits 400 to generate sufficiently large drive currents and/or voltages. The control circuits 400 and the digital control circuits, and/or microprocessor circuit 499 may be placed into a single integrated circuit, group of circuits and/or on the same circuit board.

Block diagram element 600 may represent a gyrostat positioning system to determine the attitude of the sword apparatus of the present invention. One such miniature device is commercially available from Sony Electronics and or functionally as the device employed in U.S. Pat. No. 4,959,725, the relevant herein incorporated by reference. Positional device element 600 may be used to determine the position of the sword and the attitude of the sword in the X, Y and Z axes. Switch 201 and switch arm 202 may be a safety switch, in the "deadman" circuit configuration, held in place by the player's grip on the apparatus. Because of the high torque available in this game it may be desirable to have a kill switch connected to the sword apparatus 200 requiring that the user keep the switch depressed in order for power to be imparted to the torque propulsion unit. The game may be equipped with suitable straps, such as velcro straps and/or gloves, to maintain the sword within a player's hands and not allow the sword to flip out of a sword player's hands, much like a hand guard served in part, on traditional swords. The circular devices depicted at 300, 302 and 304 may be either infrared receivers or infrared blasters or transmitters. These sensors and more, not shown, may extend around housing 200 to detect the position of a sword and/or the spatial coordinates of X, Y and Z as is denoted and further discussed in FIG. 3.

Figure 2:
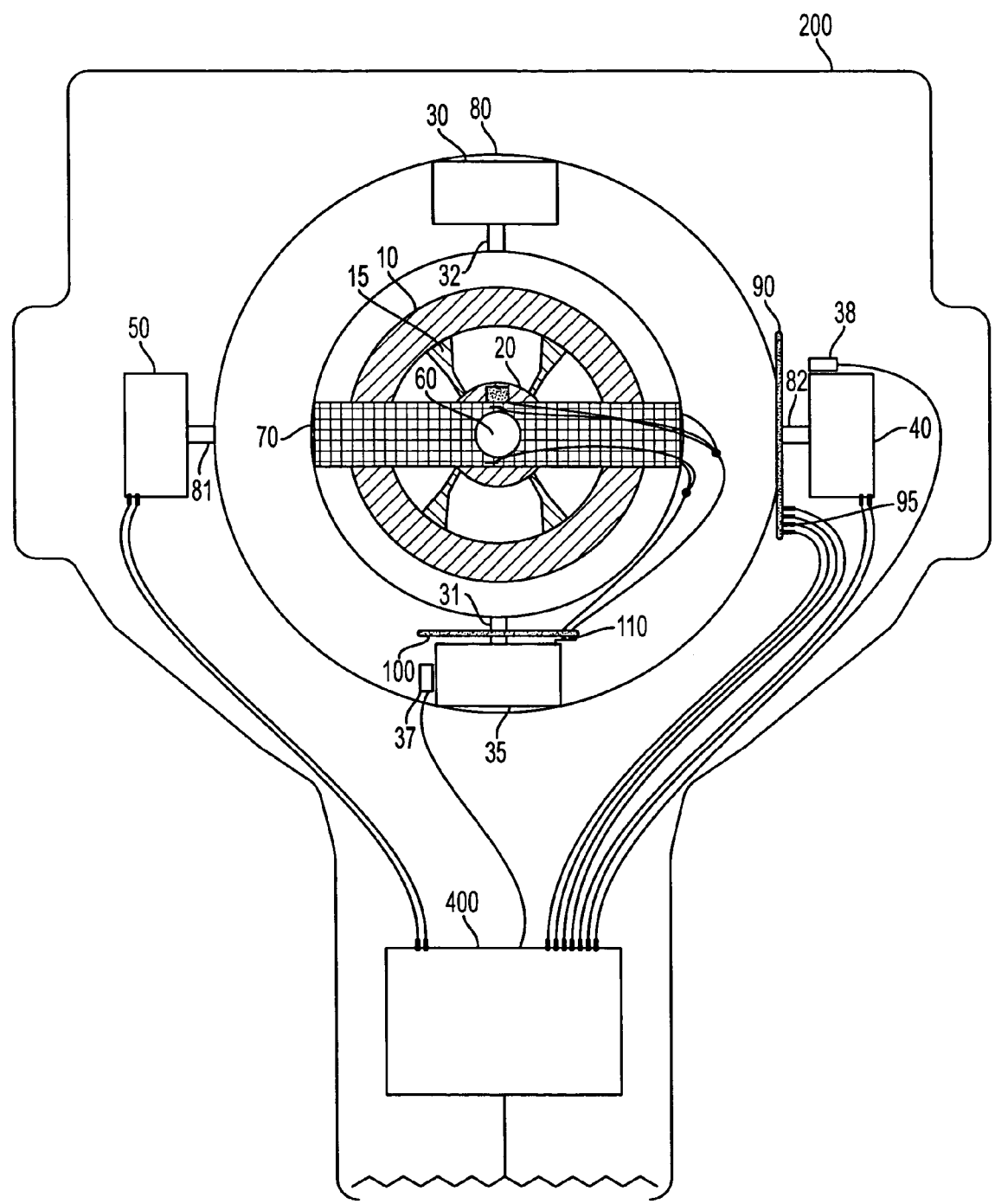
FIG. 2 shows a detailed diagram of control circuit 400 and the propulsion gyrostat device 500.

Turning now to FIG. 2, which shows a detailed mechanical diagram, not to scale, of one configuration of the gyrostat of the present invention, block 400 may contain the drive circuits necessary to drive the analog motors 20, 22 (not shown), 30, 35, 40 and 50. It is understood that motors 30, 35, 40, 50, 20 and 22 may be high torque motors such as those available from the radio controlled model cars and/or other devices from the hobby arts. It is understood that motors 20 and 22 may be high velocity motors capable of spinning the main propulsion flywheel 10 up to a sufficient velocity to impart the necessary torque to the player. The energy stored in the propulsion gyrostat is a factor of rotational velocity and the mass of the flywheel 10. Spoke 15 shows one of the spokes connecting the main body of propulsion flywheel 10, along axis 60 to motor 20 and 22. As known to those skilled in the mechanical arts, motors 20 and 22 may have mechanical assistance, e.g., gears, in rotating flywheel 10 and may also include a small transmission to help the motors 20 and 22 initially start the flywheel 10 and then shift gears into higher speed to impart a greater rotation to flywheel 10. In as much as flywheel 10 and motors 20 and 22 are the main inertial drives of the apparatus, it is understood that a suitable high speed motor may be obtained from the disk drive technology arts wherein a very flat motor is available to spin a disk at a very high rotational speed.

The main flywheel 10 is shown mounted in a double gimballed configuration. The first gimbal is along an axis between motors 30 and 35. The second gimballed axis is between motors 40 and 50. This is a (two axes of freedom) double gimballed apparatus meaning that both "pitch" and "yaw" of the main propulsion flywheel 10 may be controlled in two axes of freedom. Other mechanical configurations of double gimballed gyroscopic apparatus are known to those skilled in the art and are within the scope of the present invention. It is also understood that a single gimballed embodiment is within the scope of the invention that may utilize two and/or more gyrostats. Two propulsion gyrostats in a single gimballed configuration may be utilized by coordinating the toppling force on the two gyrostats to create the necessary torque action on the player desired by the present invention. It is also within the scope of the present invention to utilize two double gimballed gyrostats, one at the top of the sword and one at the bottom of the sword (not shown) in a "bar bell" like configuration. Such a dual gyrostatic propulsion configuration may be used to impart additional torque on the sword housing 200 to provide a more realistic simulation of the sword battle.

Sensors 37 and 38 are positional sensors that may be infrared and/or light-based sensors which may reflect off disks 100 and 90, respectively. Disk 90 and disk 100 may be reflectively "bar coded" to indicate the position of the flywheel within the gimbals via the coding of the reflected light from sensors 37 and 38 off of the disks. These positional sensors may be necessary to obtain the position of the flywheel 10, e.g., the pitch and yaw position, in order to calculate which way the propulsion gyrostat should be toppled to create the desired torque. Contacts 110 and 95 are shown as a means for transferring power and signals from the outer gimbal to the inner gimbal. Such power transfer may be accomplished by utilizing conductive metal ring fixated to disk 100 and disk 90 and pressure contacts at 110 and 95 keeping in contact with the conductive metal rings.

The main propulsion gyrostat is shown at 10. Spokes 15 hold the propulsion gyrostat to the axis 60 of the main drive motor 20. It is understood that an additional drive motor 22 may also be used. Housing 70 shows the housing of the first gimbal securing motor 20 and 22 and flywheel 10 to the first gimbal housing 70. The first housing 70 extends around to the mounting axles 31 and 32, connected to toppling motors 35 and 30 respectively. Drive motors 35 and 30 may impart the toppling torque in the first gimballed axis. It is understood that motors 30 and 35 may be replaced with a single motor and that configuration is within the scope of the present invention. Configurations that give the toppling motors 30 and 35 a mechanical advantage, such as with a mechanical gear arrangement, are also within the scope of the present invention. Circular ring 80 depicts the second gimbal housing holding motors 30 and 35 to a second gimbal arrangement. The second gimbal housing 80 connects the inner gimbal and motor drives 30 and 35 to the outer gimbal 80 through axles 81 and 82. Axles 81 and 82 are connected to the second gimbal drive motors 40 and 50. Once again, a two motor configuration is shown as a means for imparting the maximum torque available from small electric motors such as those available from the hobby and toy arts. It is understood that these toppling motors may work in tandem to impart a toppling torque in the same direction; likewise motors 35 and 30 may also work in tandem to impart the maximum toppling effect on the drive gyrostat, the drive flywheel 10. It is understood that motors 50 and 40 may be replaced by a single suitably high torque motor. It is also within the scope of the present invention to use configurations that give motor 40 and 50 a mechanical advantage for toppling the drive flywheel 10 via the inner gimbal. Inner and outer gimbal brakes and/or clutches (not shown) may be used to temporarily lock a gimbal axis which a toppling force is applied to the second gimbal axis such as disclosed in U.S. Pat. No. 5,437,420, the relevant portions herein again incorporated by reference. Function circuit board 400 is shown as providing the analog drive voltages for the motors described above.

Figure 3:
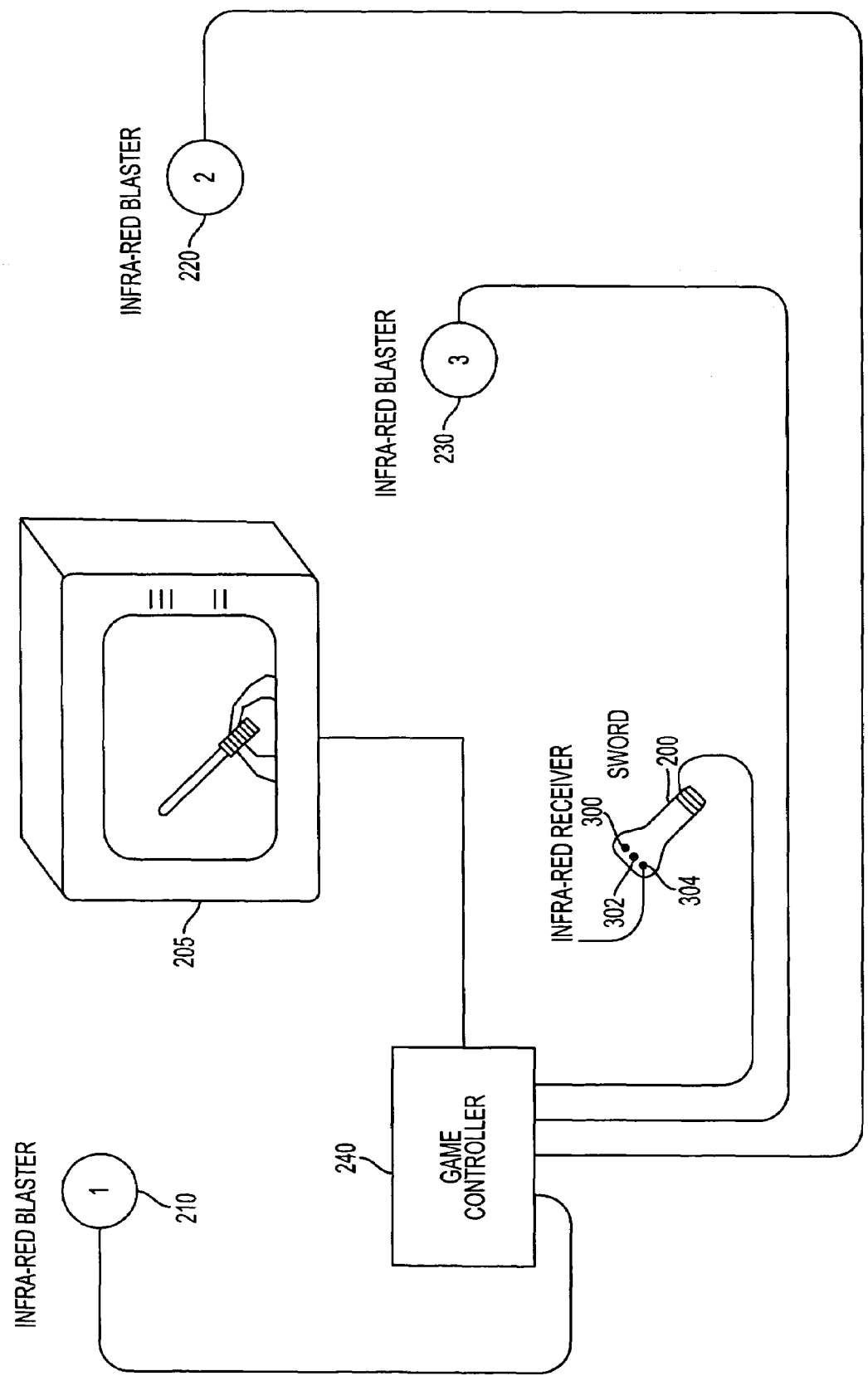
FIG. 3 shows a configuration of the present invention showing the game controller remote infrared blasters, television display, game controller and the sword device 200 of the present invention.

FIG. 3 shows the present invention in a deployment perspective showing a television and/or display 205 in a virtual reality and/or the game reality space can be projected 205 from game controller 240 in conjunction with sword housing 200. Note the configuration of remote infrared transmitter and/or receivers 210, 220 and 230. This configuration, after a suitable calibration within the scope of the present invention, may be used to triangulate the position of sword apparatus 200 using signal phase delay and/or time delay calculations between the remote elements 210, 220, 230 and the housing sensors 300, 302 and 304. It is understood that television 205 may be replaced with a suitable display such as a high definition television and/or a computer display and game controller may be embodied in personal computer software and/or a personal computer hardware apparatus and/or dedicated hardware. Infrared blaster and/or receivers 210, 220 and 230 may work in conjunction with infrared receivers and/or blasters 300, 302 and 304 to determine the position of the sword in real coordinates. The real coordinates may be determined by a timed burst from infrared blasters 210, 220 and 230 and the time delay of the burst received at any one of the sensors 300, 302 or 304 which may then be used to triangulate the position of the sword in real coordinates. Although shown in an infrared embodiment, other remote triangulation techniques are known to those in the navigational arts, such as through the use of radio frequency and ultra-violet frequencies. Television and/or display 205 may be replaced with virtual reality glasses and/or helmet arrangement. The virtual reality glasses and/or helmet may use two displays stereoscopically disposed in front of a player's eyes to give a three dimensional representation of the virtual playing field. In such a virtual reality embodiment in using virtual reality glasses it is understood that infrared sensors 210, 220 and 230 may be supplemented with additional infrared sensors to provide suitable determination of the real positional coordinates of the sword 200 and/or players head attitude and/or real position in respect to the virtual reality game. It is understood that this positioning information may be used by the game to encourage the player to re-center the sword 200 and/or to keep the sword 200 in a predetermined playing field of the game. Infrared blasters, shown at 210, 220 and 230 may be reversed, that is they may be infrared receivers and the infrared blaster may be located at 300, 302 and 304. In such a configuration a single and/or multiple infrared burst(s) may be output from 300, 302 and 304 and the timing of receiving or reception could be determined at 210, 220 and 230 in order to triangulate the real position of the sword 200. It is understood that the game has a suitable calibration mode for configuring the sensor array.

Figure 4:
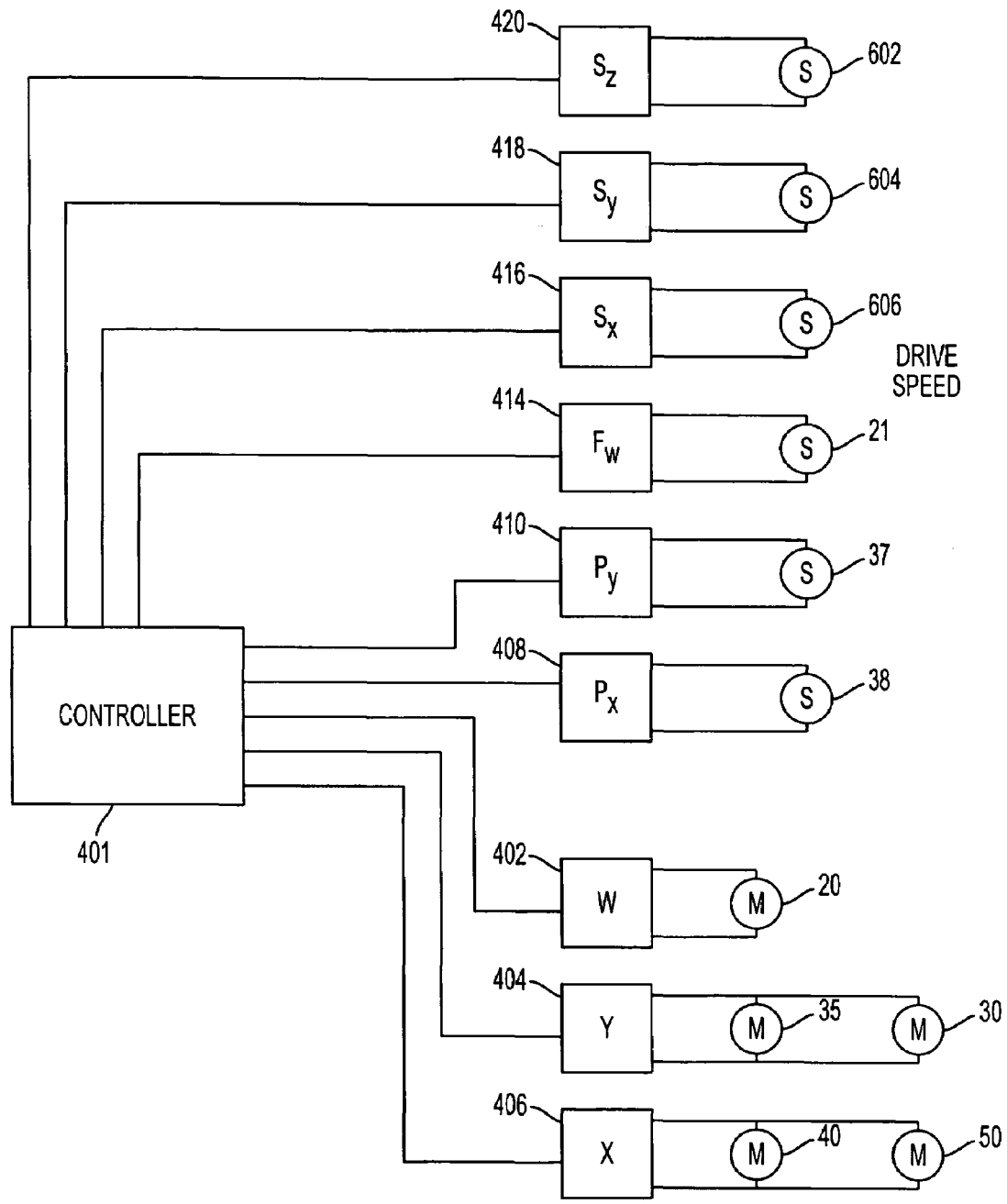
FIG. 4 shows a block diagram of control circuit 400, showing the controller output and sensor input.

FIG. 4 shows a block diagram of the control circuits 400 of the present invention. A controller 401 may be used in conjunction with drive circuits at 402, 404 and 406 to provide the voltages and currents necessary to provide the energy for rotation of the propulsion gyrostat motor 20 and/or 22 (not shown) and toppling motors 30, 35, 40 and 50. Block 402 may depict the main drive circuit for the rotation of the propulsion drive motor 20 and/or 22. Block 404 may depict the drive circuitry for toppling motors 30 and 35. Block 406 may depict the drive circuitry for toppling motors 40 and 50. It is understood that blocks 404 and 406 are representative of circuitry necessary to drive the high torque motors for the tumbling action of the present invention, these circuits may be incorporated into an application specific integrated circuit and/or incorporated with controller 401. They may also be discrete high current components such as MOSFET devices. Blocks 408 and 410 are representative of the circuits necessary to determine the position of the propulsion drive 10 from sensors 37 and 38 respectively. Such sensors may include, as previously noted, sensors 37 and 38 as optical sensors that reflect off disks 100 and disk 90 respectively to determine the pitch and yaw position of propulsion drive 10. The circuits of blocks 408 and 410 may work in conjunction with controller 401 to determine the propulsion drive 10 position. Block 414 may represent the circuitry necessary to work in conjunction with sensor 21 to determine the rotational velocity of propulsion drive 10. The rotational velocity of the propulsion drive motor 10 may vary as game play ensues. Determining the rotational frequency of propulsion flywheel 10, may also be accomplished by measuring the reflected voltage from motor drive 20 and/or 22. The reflected voltage, current and/or power factor vector may be used to determine an approximate rotational velocity and/or speed of propulsion drive 10. Blocks 416, 418 and 420 may represent the circuitry necessary for positional sensors 602, 604 and 606 to determine the pitch, yaw and/or attitude of the sword 200 when a mini-gyroscope is used to determine the position of the sword 200. Sensors 602, 604 and 606 may be incorporated into functional block 600.

Figure 5:
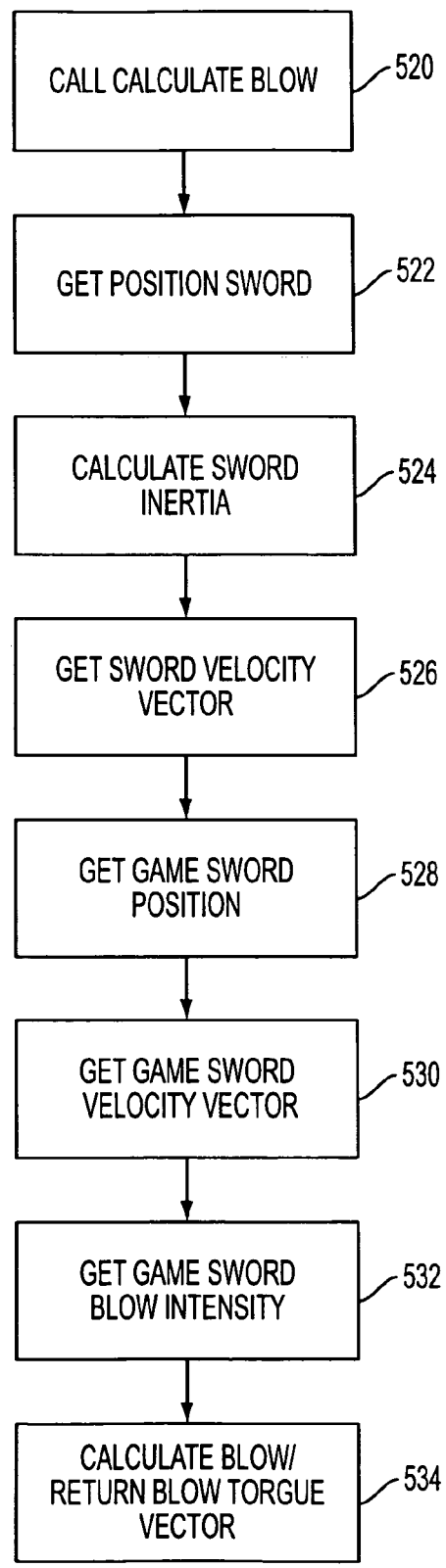
FIG. 5 shows a block diagram of the calculate blow routine which among other things, is a routine called from the game software to calculate the severity of a sword blow.

FIG. 5 shows a block diagram representing a procedure that may be used to calculate a simulated sword blow. This routine may make the initial calculation for the torque force to be applied to the pitch and yaw motor drives at outputs 404 and 406. The calculate blow routine 520 may be called when an "attacking" sword and/or other virtual object(s) comes into contact with the calculated position for the player's virtual embodiment of the sword. The calculate blow routine 520 routine may receive an impact point in the x, y, and z coordinates of the virtual space and when applicable the attacking sword velocity. Block 522 labeled "get position sword hilt" is a routine that may retrieve the actual position of a player's sword apparatus 200 from sensor 600 and/or by the other means of sensors 300, 302 and 304. The retrieved hilt point may be used to determine the distance from the sword hilt that a sword impact occurred. This distance may, in turn, be used to determine the amount of leverage, e.g., the amount of "twisting force", that the attacking sword blow may have on the sword apparatus 200. The next block 524 may calculate the sword's idealized mass. It is understood that more than one type of sword apparatus may be utilized, e.g., sword apparatus with different mass flywheels and/or rotational frequency, thus, the sword's idealized mass may be derived, at least in part, from a variable mass M, which may be the actual mass of the propulsion gyrostat and the variable omega which may be the instantaneous and/or present angular velocity and/or rotational frequency of the propulsion gyrostat. These two parameters may be used to determine the idealized mass and/or angular momentum of the propulsion gyrostat at any give time. Block 526 labeled "get sword velocity vector" may determine the sword velocity vector, e.g., the direction and speed of the sword, by successively determining the position of the player's sword and then determine from the change in position the velocity of the sword apparatus 200. The virtual sword may have an idealized and/or virtual mass that is different from the actual mass and/or inertial mass of the actual apparatus 200. For example, in one configuration the virtual mass may be represented and/or idealized as a heavy broad sword. Since a real broadsword may be a very heavy instrument, it's virtual mass may also have a certain amount of momentum because of its idealized weight and velocity. The resultant of procedural blocks 524 and 526 is a vector providing the player's virtual sword direction and force at the impact point. The next procedural block 528 "get game sword position" yields a value from the game software, much like the resultant from procedural blocks described above, which provides the position of the sword hilt from the attacking virtual sword. Block 530 labeled "get game sword velocity vector" is a vector, from the game software, providing the velocity and virtual mass of the attacking sword, similar to procedural blocks 524 and 526 described above. Again, for example only, the virtual attacking sword may also have a virtual mass idealized from a fictionalized attacking broad sword. That is, once the heavy broad sword is in "motion", it may have a momentum from its mass and velocity. Procedural block 532 labeled "get game sword blow intensity" is the force of the attacking blow at the position of the strike. This may be calculated by the well known equation that force equals mass times acceleration and/or kinetic energy equals one half the mass times velocity squared. The results of procedural blocks 528, 530 and 532 is a vector providing the direction and force at the impact point of both the attacking virtual sword and the virtual sword projected from the player's sword apparatus 200. By taking the cross product of these vectors, the factors such as angle of the sword attack, how far from the hilt the strike may be taken into account when calculating the resultant vectors. Thus, procedural block 534 labeled "calculated blow/return blow torque vector" is a product of the two vectors, that is, the vector providing the player's sword direction and force at the impact point and the attacking sword vector providing the direction and force of the impact point idealized at right after impact. The product of the two vectors may provide the resulting direction and speed of the two swords by the calculation between two idealized objects when the equation for the conservation of momentum and/or energy is applied. That is $m_1 v_1 + m_2 v_2 = m_1 v_1(t+1) + m_2 v_2 (t+1)$. Thus, in this exemplary embodiment of the present invention the two swords may "bounce" off each other with an idealized impact. That is, there is no cushion or elasticity loss in the impact of the two idealized swords. However, elasticity factors as well as other means for calculating the resultant torque from a sword blow are within the scope of the present invention and may be accommodated by the insertion of loss constants in the energy conservative equations.

Figure 6:
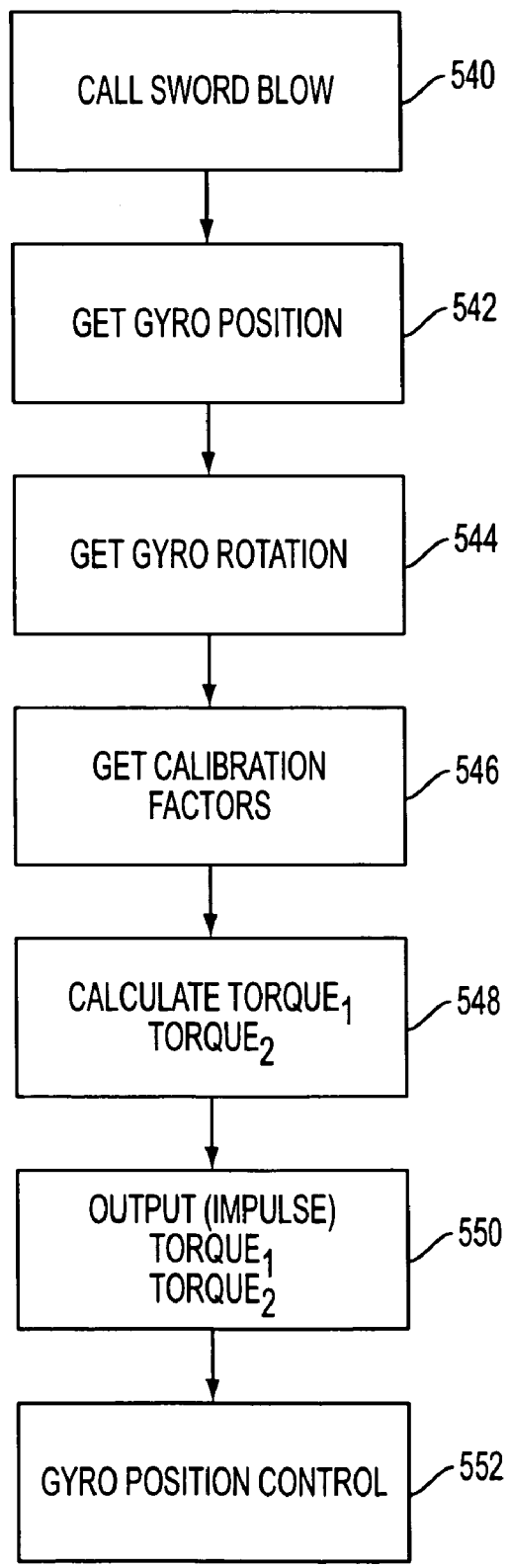
FIG. 6 shows a block diagram of a procedure for outputting the sword blow to the propulsion gyrostat 500.

FIG. 6 shows the call sword blow procedure which is used in conjunction with the procedures of FIG. 5 to calculate the actual values of the torque outputs for the pitch and yaw gyrostat toppling motors that provides the simulated impact of the sword at the player's sword apparatus 200. Procedural block 540 labeled "call sword blow" may denote the name of the software routine to perform the aforementioned torque output calculations. Turning now to the step by step procedural blocks, 542 labeled "get gyro position" may be from sensors 408 and 410 and may determine the attitude of the position of the propulsion gyrostat 10. This calculation may be important for the torque calculation because the gyrostatic force acts at a right angle to which the toppling force is applied. Thus, given that the desired torque effect for the sword apparatus is known from the calculation above, in general terms, the toppling torque applied to the propulsion gyrostat may be applied at a right angle to the propulsion gyrostat to achieve the desired torque effect. The next block 544 labeled "get gyro rotation" may be from sensor 418 and may indicate the angular velocity and/or rotational speed of the propulsion gyrostat 10. The next procedural block 546 labeled "get calibration factors" may provide operating parameters for the particular sword apparatus for which the torque output calculation is being determined. For example, as discussed above, a sword apparatus with two or more propulsion gyrostats is within the scope of the present invention. Also the mass of the propulsion gyrostat may be different for different sizes and models of the sword apparatus. Thus, block 546 may be utilized to retrieve the particular calibration factors for the particular sword apparatus for which the torque calculations are being calculated. It is understood that the calibration parameters may be encoded in a memory location associated with and/or within controller 401. It is also understood that in the preferred embodiment of the invention the actual inertial mass of the sword, which is the rotational frequency of the propulsion gyrostat times the mass of the propulsion gyrostat, may be greater than the virtual mass and/or idealized mass of the sword in order to provide excess torque and game action capacity for sword blows, e.g, at any given moment in game play the rotational frequency of the propulsion gyrostat may not be at the maximum rotational frequency and, therefore, the maximum torque effect on the sword apparatus may not be instantaneously available. The next procedural block 548 may calculate the value of the torque for output to controllers 404 and 406. This calculation may use the instantaneous inertial mass available, the desired torque amount and a compensating factor to resolve any non-linearities in the toppling motor response, as determined by conventional control systems principals, to calculate the output value. The sum of these torques may provide a toppling force at a right angle to the desired torque for the sword apparatus 200. The next procedural block 550 labeled "output impulse torque 1 and torque 2" are numerical value that may represent a value for eventual output to the toppling motors. In the preferred embodiment, these torque values are output to a predetermined memory location in controller 401 that, as will be discussed further below, are accessed by the gyrostat position control routine detailed in FIG. 7. It is understood that torque 1 and torque 2 may be a vector and/or an angular equation that takes into account the rotation of the propulsion gyrostat as torque is applied in order to translate what may be an angular torque output, due to the change in the angular position of the propulsion gyrostat, to translate the toppling force into a linear and/or straight line torque effect on the sword apparatus 200. Procedural block 552 labeled "gyro position control" denotes that the values of block 550 may be output to a memory location and/or data buffer and/or queue that will be accessed by the gyrostat position control routine detailed in FIG. 7. Procedural block 552 also provides that the call sword blow routine 540 may then terminate normally and exit and/or return.

Figure 7:
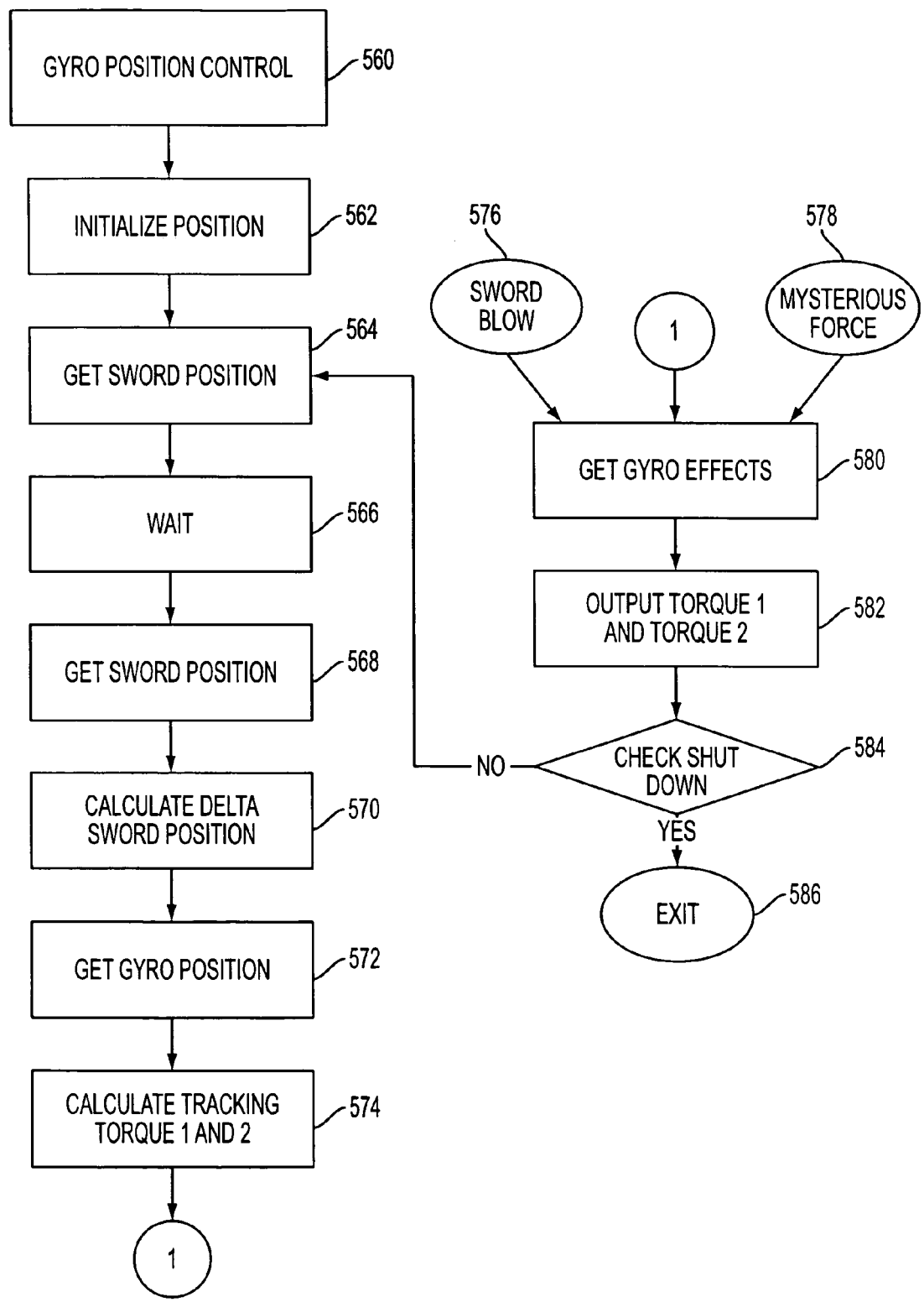
FIG. 7 shows a block diagram of the gyro position control procedural loop which controls the position and the torque on the propulsion gyrostat.

FIG. 7 shows the gyrostat position control procedure 560. The gyrostat position control procedure may be the control loop that controls the output to torque control 404 and 406 and governs the position and/or toppling of the propulsion gyroscope 10. The gyrostat position control procedure may operate in a continuous loop and may be the master routine that takes into account the sword blow torque and the "mysterious force factor", as will be discussed below, and the torque output required to cancel the force of a player rotating the sword apparatus 200 when no torque and/or tactile feedback or output on the sword apparatus 200 is desired. Taking each step in turn, procedural block 562 labeled "initialize position" may provide that when the sword is initially powered on this procedure moves the propulsion gyrostat to an initial position. For example, "toppling" or rotating the propulsion gyrostat to top dead center while it initially spins up. This may be used to initially provision software variables in the game controller 240. Procedural block 564 "get sword position" may be the sword position from block 600 and/or sensors array in the 300 series which may be used to determine the sword device 200 position. Block 566 may be a wait state that may be used to pause the procedural loop. Procedural block 568 labeled "get sword position" which may be a routine that may be identical to block 564 and may be used to get a second sword position. Procedural block 570 may use the first position from procedural block 564 and the second sword position 568 to calculate the change and/or delta in the sword apparatus 200 position, that is, the change and/or attitude in the position of the sword apparatus 200. Procedural block 572 "get gyro position" may determine, from sensors 408 and 410, the position of the propulsion gyrostat 10. Procedural block 574 may be used to calculate the tracking torque 1 and torque 2, although it is labeled "tracking torque" it may actually be a tracking voltage that topples the propulsion gyrostat to compensate for the change in the sword position from the first sword position calculated at 564 and the second sword position determined at 568. The tracking voltage may be used to topple the propulsion gyrostat in such a way as to track the position of the sword apparatus 200 so as to minimize the torque felt at the sword apparatus 200 in response to movement of the apparatus, e.g., by the player, when no torque is desired. Alternatively, the toppling motors in the relaxed and/or non-energized state in conjunction with any mechanical advantage mechanism used to couple the toppling motors to the propulsion gyrostat flywheel 10, may allow the propulsion gyrostat sufficient freedom of rotation so as to not require the tracking voltage output. However, in certain situations and/or configurations, it may be that if the propulsion gyrostat were to remain fixed and the player moved and/or changed the attitude of the sword apparatus 200, the player may feel an undesired torque at a right angle to the rotational force applied by the player. In this instance, the mechanical linkage, generally denoted in FIG. 2, may provide a predetermined mechanical degree of freedom in the coupling of the toppling motors with the propulsion flywheel 10. The predetermined degree of freedom may be used by the gyrostat position control routine 560 to provide a delay and/or predetermined degree of mechanical freedom to allow the calculation of the tracking voltages from block 574 to rotate and/or to allow the propulsion gyrostat to rotate and track the player's movement of the sword apparatus 200 without the player receiving an untoward amount of undesirable tactile feedback. The tracking voltage calculation may only be an approximate calculation and yet be a mitigating factor for undesirable torque effect, e.g., some residual torque felt by the player may actually add a desirable strangeness of the tactical feel of the sword apparatus 200. The next procedural block 580 labeled "get gyro effects" accesses the torque calculated for the sword blow, from FIG. 6, at the circular block 576 and accesses the mysterious force torque, as will be discussed below in FIG. 8, at block 578. Procedural block 580 "get gyro effects" calculates the sum of the tracking voltages from block 574, the sword blow torque from FIG. 6 and the mysterious force torque from FIG. 8 to combine these three torque vectors to determine a tracking voltage and/or voltages to create the toppling torque for the propulsion gyrostat 10. Block 582 outputs torque voltages 1 and torque voltages 2 to torque motor controllers 404 and 406.

These torque voltages are used to topple the propulsion gyrostat 10 of the present invention to provide the gyrostatic effect of the sword apparatus 200. Thus, for example, when the virtual sword is not impacting on a virtual object the output at block 582 may merely be the tracking torques from block 574 that attempts to topple the propulsion gyrostat so as to track the player's movement of sword apparatus 200. Thus, for example, when a sword blow torque is generated from the procedure described in FIG. 6, the dominant factor in the gyro effects calculation 580 and, therefore, the output at 582 may be the sword blow providing a strong output providing a strong torque at the sword apparatus 200. In a third example situation, the dominant force may be the "mysterious" force from FIG. 8, which will be discussed further below, which attempts to lead the player's sword movement through what may be subtle torque on the sword apparatus 200. The "mystery" torque may be strong or subtle on sword apparatus 200 depending on pre-programmed parameters.

Procedural block 584 checks whether the controller 401 has issued a shut down command, if yes, the gyrostat position control loop exits at 586, if no, the procedure is passed to sword position routine 564 and the control loop goes on continuously (that is, until a shut down command is received). The check shutdown routine 584 may check the dead-man switch shown as FIG. 1, switch 201, as to whether the player still has a sword in his hands and whether the controller may continue to output torque.

Figure 8:
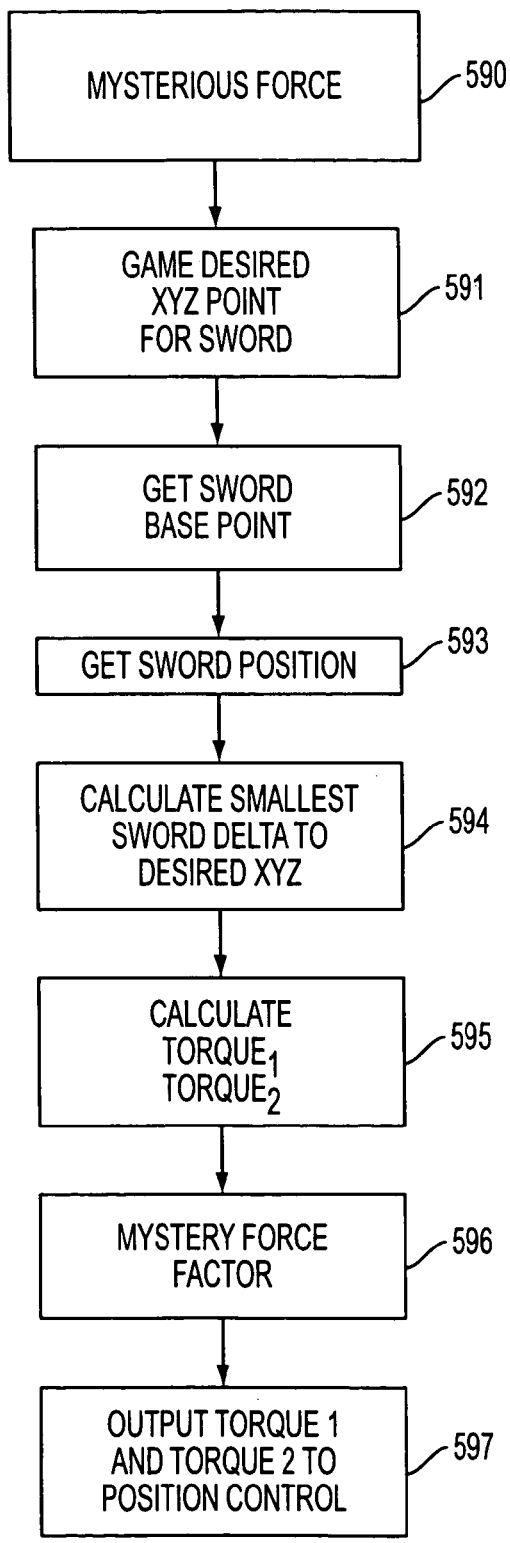
FIG. 8 is a block diagram showing the mysterious force procedure which is a part of the integration between the game software and the sword hardware apparatus of the present invention.

FIG. 8 shows the "mysterious" force calculation at procedural block 590. For example, the mysterious force in the light saber metaphor may be a fanciful force as fictionalized in the Star Wars™ story line that the sword apparatus 200 will actually lead the player to a future sword impact. Another use of the "mysterious" force may be for a swordsman training mode to teach sword fighting techniques. The mysterious force calculation may be performed at procedural block 591 by first getting a desired virtual x, y, and z point for the virtual sword. Thus, the game software provides this coordinate as it, by definition, is a point and/or coordinate wherein an game event will occur within the game domain's future. Procedural block 592 may determine the sword apparatus 200 base point, as discussed above, from sensors 600 gyrostatic determination and/or sensors 300 external determination. The base point is understood to be the hilt of the sword apparatus 200 and/or the sword handle of sword apparatus 200. Procedural block 593 may get the sword position or attitude, e.g., the angular position of the sword apparatus 200 and, thus, may determine the virtual location of the virtual sword blade extending from the sword apparatus 200. Procedural block 594 may calculate the smallest change in position of the virtual sword location to the game provided X, Y and Z coordinates, e.g., some "future event." Procedural block 595 may calculate a torque for the necessary pitch and yaw for the propulsion gyrostat, which may calculate a torque to move the virtual sword to intersect the desired X, Y and Z coordinate and/or provide a torque in the direction of the desired X, Y, and Z coordinates. Block 596 is the mysterious force factor parameter which may be a constant that is multiplied by the torque from block 595 to provide a mysterious force that is either strong, if the mysterious force factor is a large number, or subtle if the mysterious force factor is a small constant. The game metaphor and/or plot line may be adapted to provide the player additional incentive to have a subtle mysterious force factor, again, to coordinate the game play and/or the plot with the conservation of the angular momentum of the propulsion gyrostat. The next procedural block 597 may output a torque for controllers 404 and 406 to the gyro position control procedure depicted in FIG. 7. It is understood that this torque calculation may take into account the position of the propulsion gyrostat from sensor circuits 408 and 410 as well as the angular momentum of the propulsion gyrostat from sensor circuit 414 and as well as taking into account the mass factors from the controller for the particular propulsion gyrostat used by the particular sword apparatus 200. Procedural block 597 may output the mysterious force torque via a memory location or other suitable buffer structure back to FIG. 7 as previously discussed.

Turning back to FIG. 5, this routine may be configured so as to accept other factors that may effect the sword blow calculation, such as to accommodate for when the sword apparatus 200 for the virtual sword apparatus passes through an object in the game domain such as a tree or wall that as previously discussed in the light saber metaphor and thereby may allow the sword to pass through or strike through while providing some tactile feedback to the sword apparatus 200 denoting the striking through of an object. This may be accomplished by reducing the sword blow intensity factor to provide an impulse from an object, e.g., idealized as a very small virtual mass, that may allow the sword apparatus idealized momentum to strike through the object. That is, the conservation of momentum equations may allow the virtual sword to follow through an object when the object struck has a small mass relative to the virtual sword mass.

Through the interactions of the procedures outlined in FIGS. 5, 6 and 7 a comprehensive output for motor controller 404 and 406 to control the propulsion gyrostat may be accomplished through these inter-related demands on the sword movement and/or interactions with the game plot and/or game play metaphor to give a player the incentive to conserve angular momentum of the sword apparatus 200. A comprehensive controller output is disclosed and allows sword apparatus 200 to be completely controlled by the game controller 240 at FIG. 3.

Figure 9A:
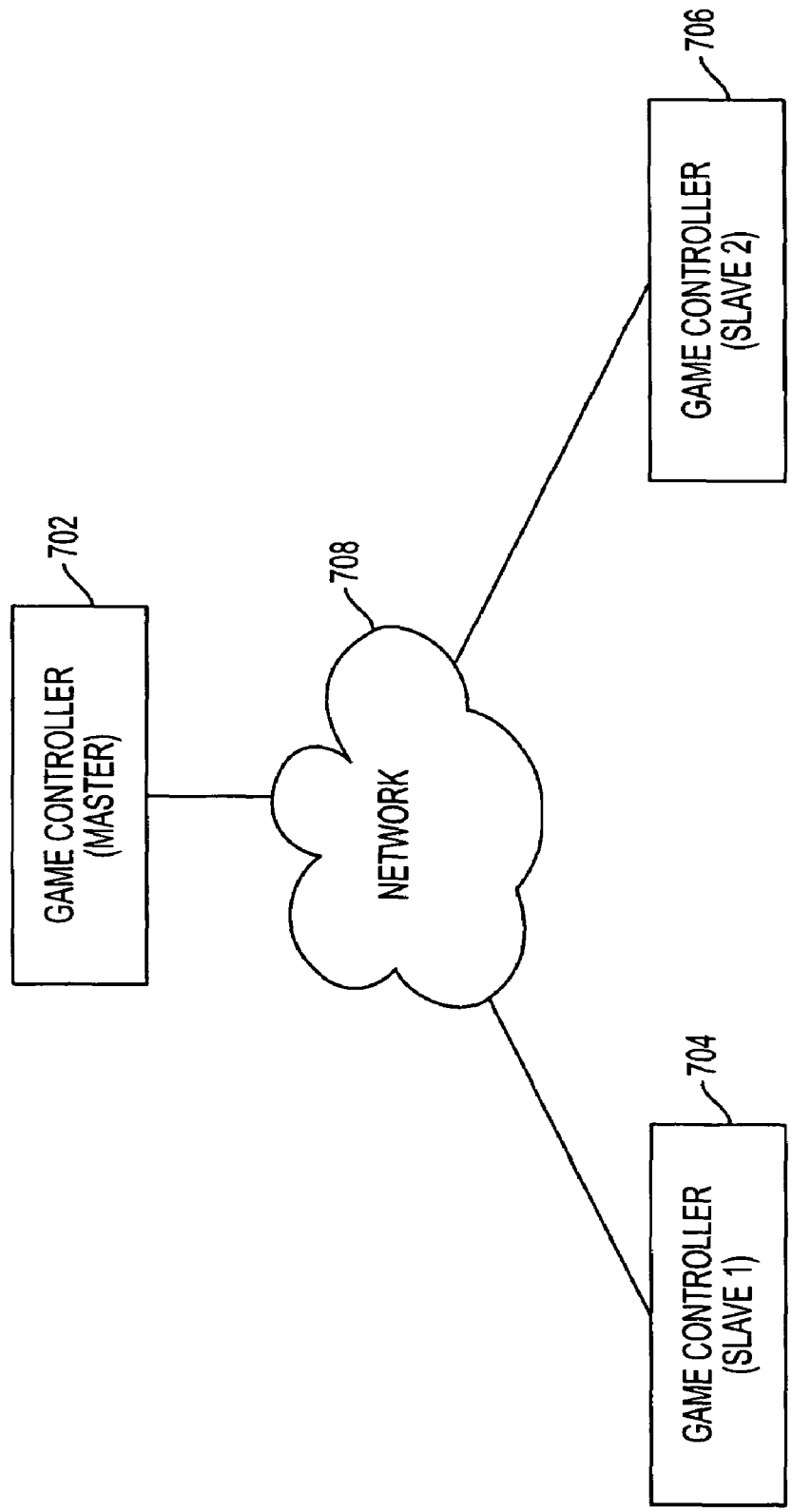
FIG. 9A is a block diagram showing a networked application of the present invention.

FIG. 9A shows the game controllers of the present invention in a network configuration. Game controller 702 may be configured as the master and game controllers 704 and 706 may be in a slave configuration.

Figure 9B:
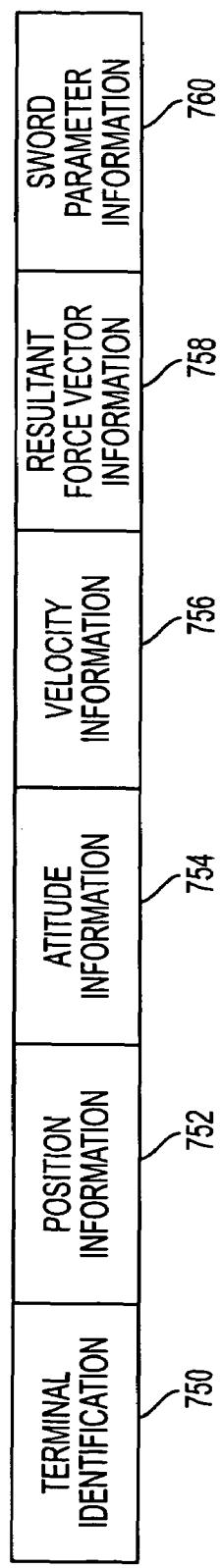
FIG. 9B shows a message protocol format that may be used in a multiplayer configuration.

A network 708 is shown which may be a TCP/IP network such as the Internet. In the master configuration, the game station programmed as the master sends, receives and coordinates the information transfer from the "slave" configured stations. Information may be transferred between the stations using the communication data packet shown in FIG. 9B. The communication packet provides a terminal identification 750, position information for a sword apparatus 752, attitude information for a sword apparatus 754, velocity information for a sword apparatus 756, resultant force vector information 758 and sword parameter information 760. The slave configured game station may periodically send this information packet to the master configured game controller. The master configured game controller may in turn, use this information to generate a virtual opponent having a virtual sword representation that is mapped into the game space. The master configured game station may relay the information from a first slave configured game terminal to a second slave configured game terminal. The master configured game station coordinates the calculation of the resultant force vector for the slave configuration game station's control output. It is understood that data packet shown in 9B may be framed with the suitable protocol overhead and transparent bits.

Turning now to FIG. 10, sword apparatus 200 is shown in a player's hand 1000 in combat with a virtual sword 1002 and virtual opponent 1004. A virtual sword blade is shown at 1006 as idealized as extending from the sword apparatus 200 as may be viewed through virtual reality goggles on a player's 1000 eyes. The opponent's sword 1002 opponent 1004 and opponent sword blade 1008 are, in this example, a virtual representation. The game controller 240 may track the position and attitude of sword apparatus 200. The positional and attitude information may be used by the game controller software to project and track the virtual blade 1006. The game controller software 240 may determine and track the velocity of the blade 1006 by using the differential positioning method described above. The game controller 240 software may also create and track the position of blade 1006 in the game space coordinate system. The game controller 240 may create and track the position of blade 1008. The game controller software may determine when the position information of blade 1006 and the position information of blade 1008 indicates a collision of the blades by tracking the area from line 1014 which has a radius 1018 and the area from line 1016 which has a radius 1020 and logically comparing the points to determine whether there is an intersection. When the game controller software determines there is an intersection the intersection point may be passed to the procedures described above in FIGS. 5, 6 and 7. In summary, a vector 1012 is determined that provides the force of the sword blow, for blade 1006, at the point of intersection. A vector 1010 is also determined providing the force of the attacking sword at the point of intersection. Through the use of the conservation of energy equations provided above, a resultant vector 1022 may be determined to provide the force vector for the resultant force at the point of intersection. The vector 1024 may also be calculated with the conservation of energy equations to provide the resultant force at the intersection point for the attacking sword 1002. The resultant force vector 1022 may be used in conjunction with the distance between the point of intersection and the sword hilt 1026 to approximate the torque generated at the point the player 1000 is gripping the sword apparatus 200. The torque is the distance times the force vector 1022. This torque output approximation may be used, inter alia, by the procedures described above to calculate the output torques and/or toppling force for the propulsion gyrostat. The above described procedures often use vectors and cartesian coordinates to describe the present invention. Other coordinate systems such as spherical and cylindrical are also within the scope of the present invention.

The above described invention and modifications and alterations thereto will are within the scope of the present invention and will provide those skilled in the arts and the general public with a new, novel and non-obvious electronic feed pack apparatus and electronic sword game.

Therefore I claim:

1. An apparatus, comprising:
   a housing;
   a flywheel disposed within said housing;
   a first gimbal in which said flywheel is mounted, said first gimbal being capable of providing a first degree of freedom for said flywheel;
   at least one or more motors capable of spinning said flywheel; and
   at least one or more sensors capable of obtaining position information of said flywheel;
   said one or more motors being capable of toppling said flywheel based at least in part on the position information of said flywheel in response to a toppling event.

2. An apparatus as claimed in claim 1, further comprising a second gimbal in which said first gimbal is mounted, said second gimbal being capable of providing a second degree of freedom for said flywheel.

3. An apparatus as claimed in claim 1, further comprising at least one or more sensors capable of obtaining position information of said housing, said one or more motors being capable of toppling said flywheel based at least in part on the position information of said housing.

4. An apparatus as claimed in claim 1, further comprising a circuit capable of receiving a control signal indicative of the toppling event, said circuit being capable of transmitting the control signal to said one or more motors.

5. An apparatus as claimed in claim 1, further comprising a circuit capable of receiving a wireless control signal indicative of the toppling event, said circuit being capable of transmitting the wireless control signal to said one or more motors.

6. An apparatus as claimed in claim 1, wherein the toppling of the flywheel by said one or more motors imparts a torque generated by said flywheel on said housing.

7. An apparatus as claimed in claim 1, wherein said housing comprises at least one of a sword, gun, bazooka, knife, hammer, or axe, or a combination thereof.

8. An apparatus as claimed in claim 1, further comprising at least one or more toppling event sensors disposed within said housing, said one or more toppling event sensors being capable of sensing a toppling event based at least in part on an acceleration of the housing.

9. An apparatus as claimed in claim 1, further comprising an audio circuit coupled to a speaker disposed in said housing, said audio circuit being capable of causing the speaker to generate an audio output in response to the toppling event.

10. An apparatus as claimed in claim 1, further comprising a clutch disposed within said housing, said clutch being capable of temporarily locking an axis of said first gimbal during the toppling event.

11. An apparatus as claimed in claim 1, wherein the toppling event is determined at least in part by said one or more circuits disposed internal to said housing and coupled to said one or more motors.

12. An apparatus as claimed in claim 1, wherein the toppling event is determined external to said housing and received as a control signal by a circuit disposed within said housing and coupled to said one or more motors.

13. A method, comprising:
receiving a position signal indicative of a position of a housing;
determining a toppling event based at least in part on a position of the housing;
generating a toppling event signal based at least in part on said determining; and
transmitting the toppling event signal to the housing, wherein the toppling event signal is indicative of a torque to be applied to said housing.

14. A method as claimed in claim 13, said receiving comprising receiving the position signal as a wireless signal.

15. A method as claimed in claim 13, said transmitting comprising transmitting the toppling event signal as a wireless signal.

16. A method as claimed in claim 13, said generating comprising:
determining a velocity vector of said housing based at least in part on the position of the housing;
calculating a magnitude of the toppling event based at least in part on the velocity vector; and
encoding the magnitude of the toppling event in the toppling event signal.

17. A method as claimed in claim 13, further comprising displaying a representation of the housing on a display at a position on the display representative of the position of the housing.

18. A method as claimed in claim 13, further comprising:
displaying a representation of the housing on a display at a position on the display representative of the position of the housing; and
displaying at least one other object on the display, said generating being executed in response to the representation of the housing on the display colliding with the at least one other object on the display.

19. A method as claimed in claim 13, further comprising:
displaying a representation of the housing on a display at a position on the display representative of the position of the housing;
displaying at least one other object on the display;
determining a velocity vector of a collision of the representation of the housing on the display with the one other object on the display;
calculating a magnitude of the toppling event based at least in part on the velocity vector; and
encoding the magnitude of the toppling event in the toppling event signal.

20. An article comprising a storage medium having stored thereon instructions that, if executed by a computing platform, result in the application of a torque to a housing by:
receiving a position signal indicative of a position of the housing;
determining a toppling event based at least in part on a position of the housing;
generating a toppling event signal based at least in part on said determining; and
transmitting the toppling event signal to the housing, wherein the toppling event signal is indicative of a torque to be applied to said housing.

21. An article as claimed in claim 20, wherein the instructions, if executed, further result in application of a torque to the housing by receiving the position signal as a wireless signal.

22. An article as claimed in claim 20, wherein the instructions, if executed, further result in application of a torque to the housing by transmitting the toppling event signal as a wireless signal.

23. An article as claimed in claim 20, wherein the instructions, if executed, further result in application of a torque to the housing by:
determining a velocity vector of said housing based at least in part on the position of the housing;
calculating a magnitude of the toppling event based at least in part on the velocity vector; and
encoding the magnitude of the toppling event in the toppling event signal.

24. An article as claimed in claim 20, wherein the instructions, if executed, further result in application of a torque to the housing by displaying a representation of the housing on a display at a position on the display representative of the position of the housing.

25. An article as claimed in claim 20, wherein the instructions, if executed, further result in application of a torque to the housing by:
displaying a representation of the housing on a display at a position on the display representative of the position of the housing; and displaying at least one other object on the display, said generating being executed in response to the representation of the housing on the display colliding with the at least one other object on the display.

26. An article as claimed in claim 20, wherein the instructions, if executed, further result in application of a torque to the housing by:
   displaying a representation of the housing on a display at a position on the display representative of the position of the housing;
   displaying at least one other object on the display;
   determining a velocity vector of a collision of the representation of the housing on the display with the one other object on the display;
   calculating a magnitude of the toppling event based at least in part on the velocity vector; and
   encoding the magnitude of the toppling event in the toppling event signal.

* * * * *